United States Patent [19]

Yamashita et al.

[11] Patent Number: 5,056,495
[45] Date of Patent: Oct. 15, 1991

[54] FUEL SUPPLY DEVICE AND HEATING DEVICE

[75] Inventors: Takahisa Yamashita, Suntoh; Kazuo Kayanuma, Gotenba, both of Japan

[73] Assignee: Texas Instruments Incorporated, Dallas, Tex.

[21] Appl. No.: 515,939

[22] Filed: Apr. 27, 1990

[30] Foreign Application Priority Data

Jun. 20, 1989 [JP] Japan .................. 1-158758

[51] Int. Cl.$^5$ .......................... F02M 31/00
[52] U.S. Cl. .................. 123/549; 123/547; 123/557
[58] Field of Search ........... 123/549, 547, 545, 557, 123/193 CH

[56] References Cited

U.S. PATENT DOCUMENTS

| | | |
|---|---|---|
| 3,145,699 | 8/1964 | High . |
| 3,760,780 | 9/1973 | Jordan . |
| 3,908,620 | 9/1975 | Maekawa et al. ............ 123/547 |
| 3,930,477 | 1/1976 | Jordan ......................... 123/549 |
| 4,361,125 | 11/1982 | Igashira et al. ............. 123/549 |
| 4,378,001 | 3/1983 | Takeda et al. . |
| 4,413,605 | 11/1983 | Leoni ........................... 123/547 |
| 4,489,232 | 12/1984 | Wada et al. ................. 123/549 |
| 4,834,053 | 5/1989 | Van Der Ploeg et al. ... 123/549 |
| 4,967,706 | 11/1990 | Van Wechem et al. . |

FOREIGN PATENT DOCUMENTS

3247978 6/1984 Fed. Rep. of Germany .
3426469 5/1986 Fed. Rep. of Germany .

Primary Examiner—Andrew M. Dolinar
Assistant Examiner—M. Macy
Attorney, Agent, or Firm—James P. McAndrews; John A. Haug; Melvin Sharp

[57] ABSTRACT

A fuel supply device and heating device or system for an electrically controlled fuel injection engine has an air intake and a fuel injector arranged to direct air and fuel respectively into a cylinder inlet passageway leading to a cylinder inlet valve opening in an engine cylinder and has a heating device located in the passageway having a heating surface arranged to receive fuel from the fuel injector for heating the fuel and deflecting it or directing it into the cylinder through the cylinder inlet valve opening substantially free of condensing contact with walls of the passageway, thereby to assure that the proper ratio of air and fuel as provided by the electronic controls of the engine are properly received in the engine cylinder.

2 Claims, 8 Drawing Sheets

FUEL SUPPLY DEVICE AND HEATING DEVICE

BACKGROUND OF THE INVENTION

This invention relates to a fuel supply device and heating device and, more particularly, to a fuel supply device for an electronically controlled fuel injection system and a fuel heating device to be used therein.

In a conventional spark ignition internal combustion engine such as a gasoline engine, a carburetor is employed for sending a mixture of gasoline and air to a combustion chamber. The carburetor has the function of atomizing the gasoline by utilizing the vacuum or negative pressure inside the engine and making a combustible gas (mixed air and fuel) by automatically supplying a suitable quantity of air, as there is need for it. Accordingly, gasoline is only supplied as the vacuum or negative pressure requires, with the consequence that accelerator control of the engine is less responsive than would be desired.

Particularly in the case of a passenger automobile, it is necessary to supply a large quantity of gasoline to the combustion chamber to increase acceleration as soon as the accelerator is stepped on. In the case of a racing car, in particular, the responsiveness in this regard can determine victory or defeat.

In recent years, therefore, the use of a fuel injector in the place of a carburetor is becoming wide-spread. Since the fuel injector does not rely on the negative pressure inside the engine but atomizes and injects the gasoline in a positive manner and it can be installed in the neighborhood of the combustion chamber close to a cylinder opening, the aforementioned response to accelerator control is more satisfactory. An electronically controlled fuel injection system which controls the amount of gasoline injected by a computer has a particular advantage in that the supply of a mixed air and fuel is effected under the optimal conditions at all times.

However, in such conventional fuel injection systems, some difficulty is experienced when the engine is cold during engine start-up in that a part of the injected fuel contacts the wall of the engine passageways leading to the engine cylinders and condenses on the passageway walls with the result that the amount of gasoline, and therefore the ratio of air to gasoline, entering the engine cylinder is less than optimum at just the time when acceleration is desired. As a result, satisfactory acceleration of the engine is not achieved immediately after engine start-up and the advantage of the fuel injection system is diminished. Attempts have been made to heat the air and/or fuel being furnished to the noted cylinder inlet/passageways but such attempts have tended to increase air passage resistance in the passageways or to otherwise disrupt the balance of air fuel mixture furnished to the cylinder inlet openings making it impossible to achieve the optimum air fuel ratios during the engine start-up period.

BRIEF SUMMARY OF THE INVENTION

The object of this invention is to provide a fuel supply device which is capable of supplying sufficient fuel to the combustion chamber even at the time of the engine start-up and which guarantees the engine operation under the optimal conditions at all times and a heating device which is to be used therewith.

Briefly, described, in a preferred embodiment, the invention relates to a fuel supply device wherein there are provided a fuel injector, a fuel passageway which leads the fuel that has been injected from this fuel injector to a combustion chamber together with an air intake, a heating device which has been arranged in this fuel passageway, with a heating surface that heats the aforementioned injected fuel and aforementioned air intake and has a deflecting or rectifying surface that deflects or rectifies the direction of at least the aforementioned air intake in the direction of a cylinder inlet opening comprising the entrance to the aforesaid combustion chamber.

In another preferred embodiment, the invention relates to a fuel supply device wherein there are provided a fuel injector, a fuel passageway which leads the fuel that has been injected from this fuel injector to a combustion chamber together with the air intake and a heating device which has been arranged in that region which the aforementioned injected fuel reaches and which faces the entrance to the aforementioned combustion chamber in the wall surface of this fuel passageway, with a heating surface that heats the aforementioned injected fuel and aforementioned air intake being provided in this heating device.

The third preferred embodiment of the invention relates to a heating device in which there are provided a heating surface that is arranged in the fuel passageway that leads the fuel that has been injected from the fuel injector to the combustion chamber together with the air intake and that heats the aforementioned injected fuel and aforementioned air intact and has a rectifying surface that rectifies the direction of at least the aforementioned air intake toward the entrance to the aforementioned combustion chamber.

The fourth preferred embodiment of the invention relates to a heating device in which there is provided a heating surface that is arranged in that region that the aforementioned injected fuel reaches and that faces the entrance to the aforementioned combustion chamber and that heats the aforementioned injected fuel and the aforementioned air intake.

DESCRIPTION OF THE DRAWINGS

Other objects, advantages and details of the invention appear in the following detailed description of preferred embodiments of the invention, the detailed description referring to the drawings in which.

Figure 13:
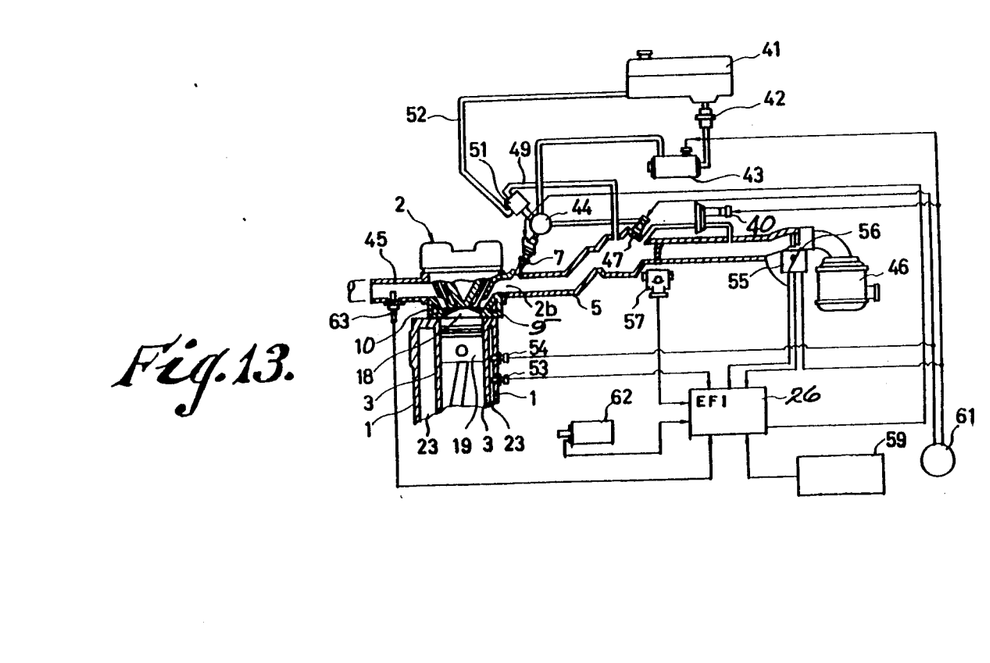
FIGS. 13 and 14 show the conventional fuel supply system known in the art, FIG. 13 diagrammatically illustrating the control system for a gasoline engine of the electronically controlled fuel injection system type and FIG. 14 illustrating a cross section view along a line through a combustion chamber of a conventional gasoline engine.

Referring to the drawings, FIG. 13 provides a broad outline of a conventional control system showing an example of an outline of a conventional control system showing an example of a gasoline engine incorporating an electronically controlled fuel injection system.

The gasoline that has come out of the fuel tank 41 as pumped by a fuel pump 43 is initially supplied both to a start-up fuel injector 47 and an ordinary fuel injector 7 through a switch valve 44 at the time of engine start-up to be injected into an air intake manifold 5 and a mixed gas passageway 2b of the cylinder head 2 respectively.

The air intake is supplied to a location which is adjacent to the start-up injector 47 inside the air intake manifold 5 through an air cleaner 46 and an air valve 40 that controls the amount of the intake. The air intake is further supplied to the normal injector 7 from a branch pipe 49 via a pressure adjuster 51 and the switch valve 44 and it is there injected into the mixed gas passageway 2b together with the gasoline. When the engine assumes the normal or regular running state, the switch valve 44 is switched, with a result that the gasoline is injected into the mixed gas passageway 2b from the normal injector 7 alone.

The start-up injector 47 is used for a prescribed period of time by means of a time switch 54 and the normal injector 7 is controlled in the following manner:

A water temperature sensor 53 detects the temperature of the cooling water inside the water-cooling jacket 23 and an injector control computer 26 controls the gas quantity and intake air quantity of the normal injector 7 on the basis of the aforementioned detection result. In FIG. 13 of the drawing, reference numeral 45 is an exhaust manifold, 9 is an air intake valve, 10 is an exhaust valve, 18 is a combustion chamber, 1 is a cylinder block, 3 is a cylinder liner, 19 is a piston, 52 is a piping that returns the gasoline that has become excessive by the control of the injector control computer 26 to the fuel tank 41, 55 is an air flow meter, 56 is an air intake sensor, 57 is a throttle position sensor, 59 is an emission control computer, 62 is an ignition control coil, 61 is an ignition switch, and 63 is an oxygen sensor that detects the amount of oxygen in the exhaust gas.

Figure 14:
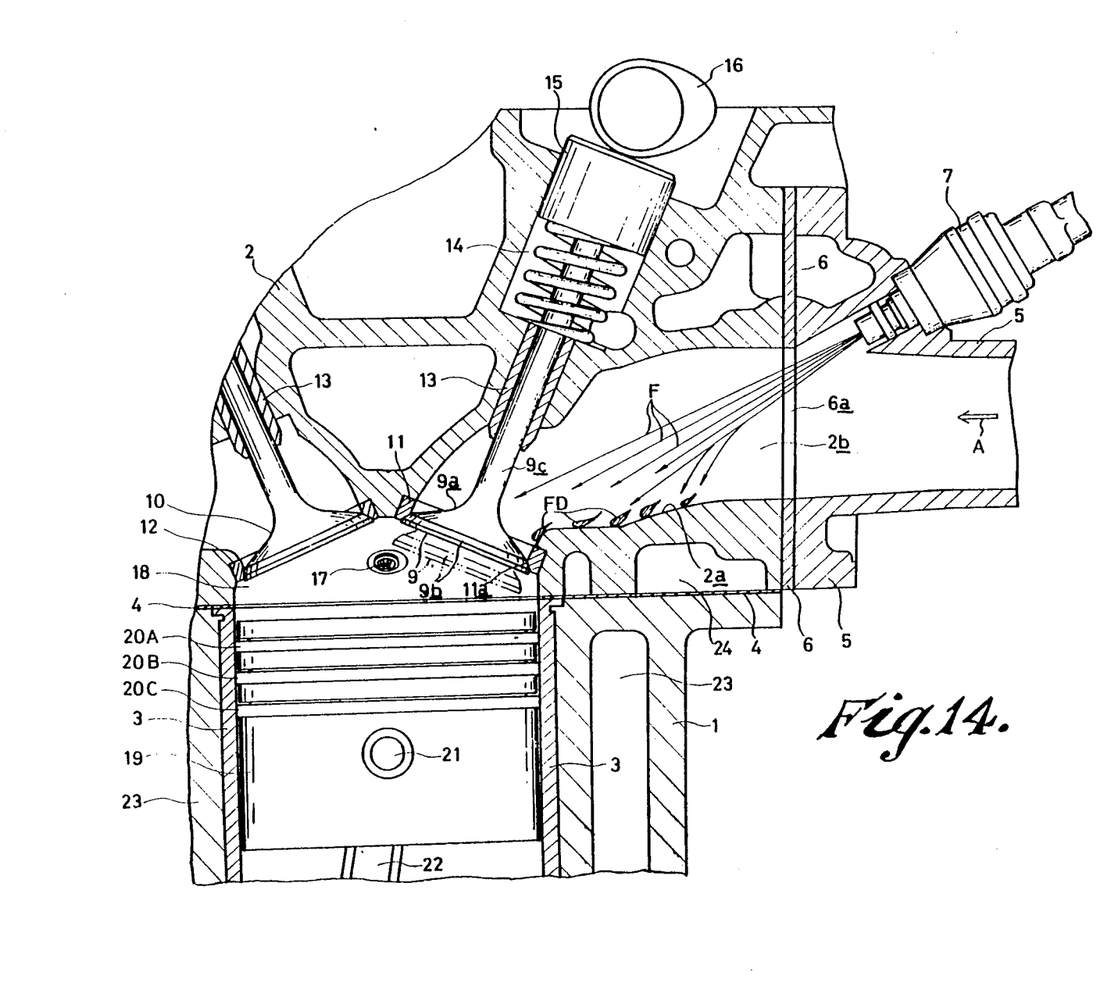

In an engine that is constructed as shown in FIG. 13, however, it found that there is the following problem:

At the start-up of an engine, the engine is cool and a part of the atomized gasoline F that has been injected from the injector 7 in the conventional system as shown in FIG. 14 develops dew or fuel vapor condensation by contacting the lower wall surface 2a of the mixed gas passageway 2b of the cylinder head 2 that is cool, thereby forming liquid drops FD, with a result that the amount of the gasoline that enters the combustion chamber 18 is reduced and does not correspond to the air furnished to the cylinder.

The fuel drops FD tend to be converted into hydrocarbons and, as such, are not suitable as a fuel. The cylinder head 2 is designed to be warmed by leading the cooling water whose temperature has been elevated after being used in the cooling of the cylinder liner 3 to the warm water jacket 24. However, it is not warmed at the time when the engine is not on and is typically cold at engine start-up.

Under the circumstances, it will not be possible to proceed with satisfactory acceleration immediately after the start-up of the engine, with a result that the advantage of using a fuel injector is diminished.

Where attempts were made to heat the air or fuel intake by using a heater in the past, it has been found it tends to increase the air passage resistance and disturb the current of the air intake, thereby making it impossible to achieve a prescribed ratio of air-fuel mixture actually reaching the cylinder.

Figure 1:
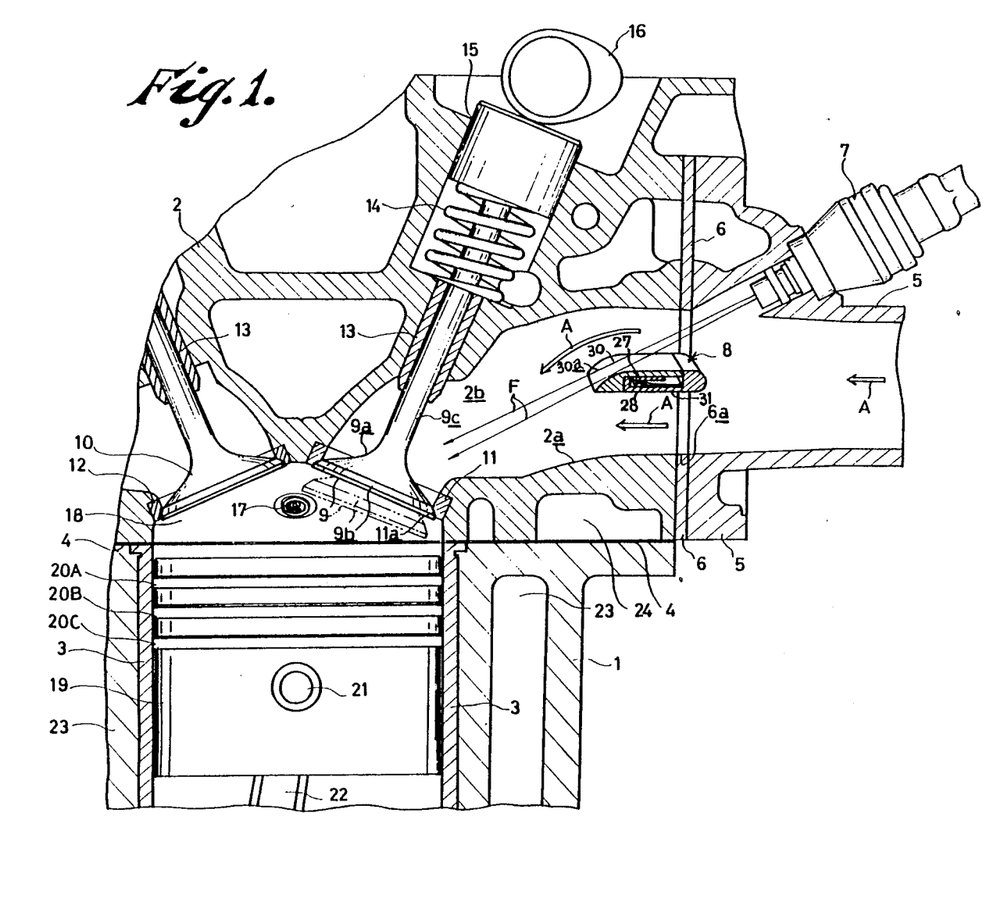
FIG. 1 is a cross section view along a line through the combustion chamber of an engine illustrating a preferred embodiment of the fuel supply and heating device of this invention.

In accordance with the present invention, however, as shown in FIG. 1, improved and advantageous results are achieved, FIG. 1 being a cross section view along a line through the combustion chamber area of a gasoline engine of the double overhead cam shaft (DOHC) type incorporating the present invention.

Thus, as shown in FIG. 1, on the cylinder block 1 there is fixed a cylinder head 2 through a gasket 4. The cylinder head 2 is preferably made of an aluminum alloy and is electrically grounded in the vehicle power system. The valve guides 13 and 13 that are compressively inserted into the cylinder head 2 have an air intake valve 9 and an exhaust valve 10 inserted therein in such a manner as will make reciprocating motion possible and are in contact with an air intake valve seat 11 and an air exhaust valve seat 12 respectively.

In the drawing, reference numeral 9a is the valve head, 9b is the valve face and 9c is the valve stem. The air intake valve 9 is given bias by a spring 14 and is in contact with a cam shaft 16 through a "tappet" 15. The air exhaust valve 10 is provided on the cylinder head 2 in the same mechanism as the air intake valve 9; however, this will not be shown in the drawings.

A piston 19 is inserted into a cylinder liner 3 that is inserted into the cylinder block 1, is sealed by means of the first pressure ring 20A and the second pressure ring 20B, and the lubrication of the lubricant oil in the cylinder is controlled by an oil scraping ring 20C.

On the outer side of the cylinder liner 3, there is formed a water-cooling jacket 23, whereby the possible excessive heating of the cylinder liner 3 is prevented by water cooling. The cooling water that has been used in cooling is led to a warm water jacket 24 so as to warm the lower portion 2a of the cylinder head 2.

In the cylinder head 2, an air intake manifold 5 is installed through a mount 6, preferably a thermal and electrical insulator, and an injector 7 is fixed on the air intake manifold 5.

In accordance with this invention, a heater 8 is provided inside the mixed gas passageway 2b of the cylinder head 2. In FIG. 1, a heater 8 alone is shown obliquely or in perspective to facilitate understanding. The structure of the heater 8 will be explained later on the basis of FIGS. 2 and 4.

The heater 8 is arranged at such a position that the atomized gasoline F that is injected from the injector 7 collides with it. Both the air intake A and the injected gasoline F are heated by the heater 8 and are deflected in a rectified direction toward the cylinder inlet opening or entrance to the combustion chamber 18 defined by the valve seat 11.

FIG. 1 shows the state immediately before the piston 19 reaches the upper dead point. Reference numeral 22 is a connecting rod that is freely movable on the piston 19 by means of a piston pin 21. At this position of the piston 19, the air intake valve 9 comes down to the position indicated by the broken lines in opposition to the intensified bias or force of the spring 14 through the rotation of the cam shaft 16, and there develops the cylinder inlet opening between the air intake valve 9 and the air intake valve seat 11, with a result that the mixed gas enters the combustion chamber 18.

The mixed gas that has entered the combustion chamber 18 is ignited by a spark that is generated from an ignition plug 17, thereby causing an explosion and thus lowering the piston 19, and the crank shaft which is not shown in the drawing but which is located below the connecting rod 22 is caused to rotate in the clockwise direction. At this time, the air intake valve 9 is restored to the original position which is indicated by the solid lines, with a result that the valve face 9b contacts the face of the air intake valve seat 11a, thereby together with the valve 10 and air exhaust valve seat 12 sealing the combustion chamber 18.

The atomized gasoline F that has been blown out of the injector 7 collides with the heater 8 as described earlier, thereby being heated, and is also deflected or directed in rectified direction in such a way as to move toward the cylinder inlet opening in combustion chamber 18 together with the intake air (or the mixed gas) substantially free of contact with the cylinder head 2.

Accordingly, no dew or fuel condensation takes place as shown in FIG. 14 even when the cylinder head may be cool at the time of the start-up, and as a result, the prescribed amount of gasoline is supplied to the combustion chamber to achieve the desired air-fuel ratio in the chamber irrespective of the temperature of the cylinder head.

The amounts of the air intake and the gasoline are controlled by a computer, depending upon the operating conditions of the engine as explained in connection with FIG. 13. In the combustion chamber, therefore, the optimal supply of the mixed gas takes place in response to the state of the engine at each time interval, with a result that ideal driving is guaranteed.

It is therefore possible to eliminate the warm water jacket 24 if desired, thereby simplifying the structure of the cylinder head.

In addition, it is possible to omit the start-up injector 47 shown in FIG. 13 if desired.

Figure 2:
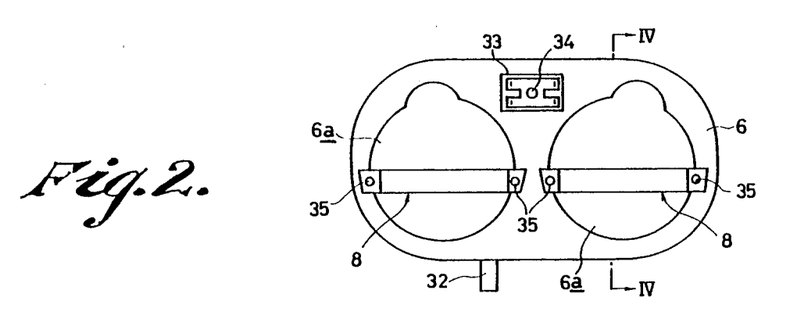
FIG. 2 is a right-side elevation view of a heater unit shown in FIG. 1.
Figure 3:
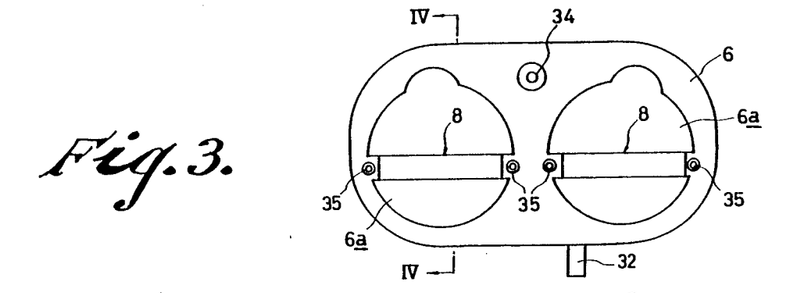
FIG. 3 is a left-side elevation view of the heater unit of FIG. 2.
Figure 4:
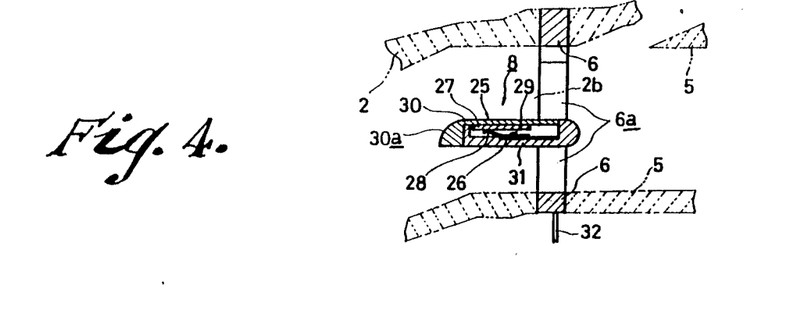
FIG. 4 is a cross section view along line IV—IV in FIG. 3.

FIG. 2 is a right-side view of the heater, FIG. 3 is an enlarged left-side view of the same (side view as viewed from the valve side of the heater as shown in FIG. 1), and FIG. 4 is a cross section view along line IV—IV in FIG. 3.

In this example, the heaters for two cylinders are made into an integrated single body. In FIG. 4, furthermore, the cylinder head 2 and the air intake manifold 5 are shown by broken or imaginary lines.

A pair of through holes 6a are provided in the plate-like support or insulator 6 and a heater 8 is installed on the insulator 6 by means of rivets 35 in such a manner as to bridge each of the through holes 6a.

The heater 8 is constructed as a wide-area element and a heating part 25 containing a ceramic electrical resistance element 27 of positive temperature coefficient (PTC) such as doped barium titanate or the like is arranged as a built-in part of the heater. In the heating part 25, the upper surface of the PTC element 27 is fixed and electrically connected to an aluminum heat transfer sheet 30 by an electroconductive binder, etc. and the lower surface of the PTC element is led to an electric source terminal 32 through a contact spring 28 (which is fixed to the electric source terminal sheet 26 by means of a rivet 29).

The electric source terminal 32 is buried in the heat insulator 6 to connect to the sheet 26 as will be understood. The sheet 30 mounting the PTC element is connected to a source terminal 33 that has been installed on the insulator 6 by means of a rivet 34 as will be understood.

Since the heater 8 in this example transmits the heat that has been produced in the aforementioned heat generating part 25 through a heat transfer plate 30 that extends throughout the entire area, it has a structure which is suitable for wide-area heating.

In other words, the aforementioned heater 8 is capable of effectively heating the atomized gasoline F that is blown from the injector 7 as well as the air intake A as shown in FIG. 1. In this case, electricity is passed by using an automobile battery as an electric source for energizing the PTC element 27 which is the heating source of the heater 8, and the element 27 after energizing becomes substantially instantaneously heated to about 140 to 150 degrees centigrade for example, with the result that the atomized gasoline F that collides with the heat transfer plate (Al plate) 30 immediately after engine start-up can be heated by this heat. Alternately PTC heater elements with lower operating temperatures are also used.

Accordingly, the heat efficiency (temperature elevation effect) becomes extremely great and, therefore, it becomes possible to effect the desired heating in a short period of time. Moreover, the heater temperature can be set in a certain range, if desired, or interrupted after a period of time, by regulation of the electric source voltage.

In addition, the element 27 has a positive temperature coefficient. When the heating purpose is achieved as the temperature of the element rises to a prescribed degree, the state thus obtained due to an increase in the electric resistance is the same as the automatic shut-off of electricity. Accordingly, it is highly convenient to provide the desired heating and to hold the heater at a prescribed temperature without risk of elevating the temperature of the heater 8 to an unsafe level.

Moreover, the surface of the down-stream side edge of the heat transfer plate 30 forms a bent surface 30a that tilts downward and the surface of the heat transfer plate 30 as a whole is streamlined. Because of this, the air intake A and the atomized injected gasoline F shown in FIG. 1 are deflected or directed in a rectified direction toward the back of the valve head 9a of the air intake valve 9 and the cylinder inlet opening defined by the valve seat 11, thereby being supplied to the combustion chamber 18 as a mixed gas as a whole and thus supplying an ideal mixed air-fuel gas ratio in response to the condition of the engine and the desired engine acceleration.

The installation angle and the installation position of the heater 8 are set in accordance with the design of the engine so the heating surface of the heating part 25 receives fuel from the fuel injector at a selected angle to deflect the fuel at a selected angle substantially directly into the cylinder inlet opening.

Figure 5:
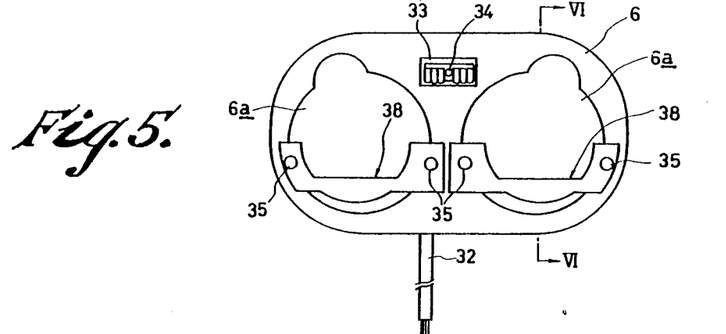
FIG. 5 is a right-side elevation view of an alternate embodiment of a heater of this invention.
Figures 6, 7:
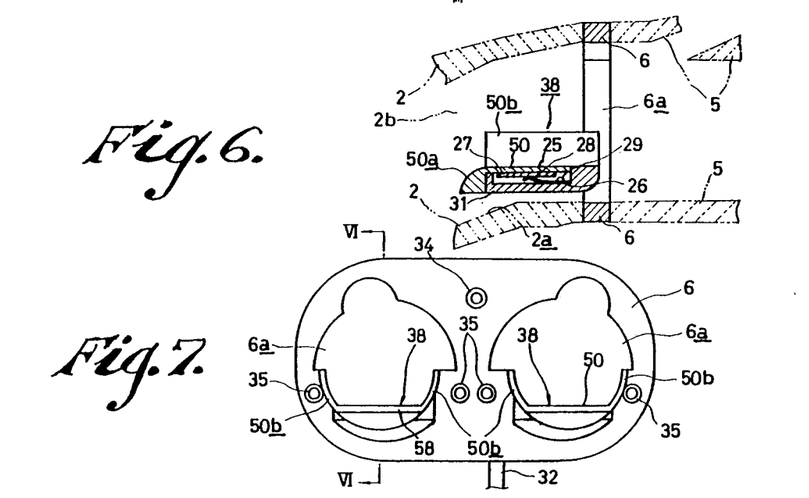
FIG. 6 is a cross section view along line VI—VI in FIG. 5.
FIG. 7 is a left-side elevation view of the heater shown in FIGS. 5 and 6.

FIGS. 5 through 7 show an example in which that portion which bends from both ends of the heat transfer plate 30 of the heater is extended upward and the heater is arranged in closer proximity to the lower part of the cylinder head. FIG. 5 shows a right-side elevation view of the heater, FIG. 7 shows a left-side elevation view of the same, and FIG. 6 is a cross section view along VI—VI line in FIG. 5.

The heater 38 is similar in structure to the heater 8 shown in FIGS. 2 through 4 as described above and those parts which are common to these figures are shown by the same reference numerals with no further explanations being given (as elsewhere hereafter in this text).

On the side edge of the tip of the heat transfer plate 50, there is formed a bent tilted surface 50a like the one shown in FIG. 3. A pair of bent parts 50b and 50b that bend upward in parallel with the inner peripheral surface of the insulator through hole 6a from both sides of the flat part are provided. The rest is the same as in the heater 8 shown in FIGS. 2 through 4.

As shown in FIG. 6, the heater 38 is arranged in the neighborhood of the lower part 2a of the cylinder head in the mixed gas passageway 2b of the cylinder head 2. Thanks to an arrangement like this, the collision between the injected gasoline from the injector (which is not shown in FIG. 6 of the drawing) and the lower part 2a of the cylinder head can be prevented more effectively. The bent parts 50b and 50b of the heat transfer plate 50 prevent the aforementioned injected gasoline from coming into collision with the lower side surface of the mixed gas passageway 2b and, at the same time, increase the surface area of the heat transfer sheet 50, thereby more effectively heating the injected gasoline.

In the manner described above, the heater 38 achieves an extremely marked effect of predetermining or setting the supply of the mixed gas to the combustion chamber under all the more optimal conditions at all times in response to the state of the engine.

Figure 8:
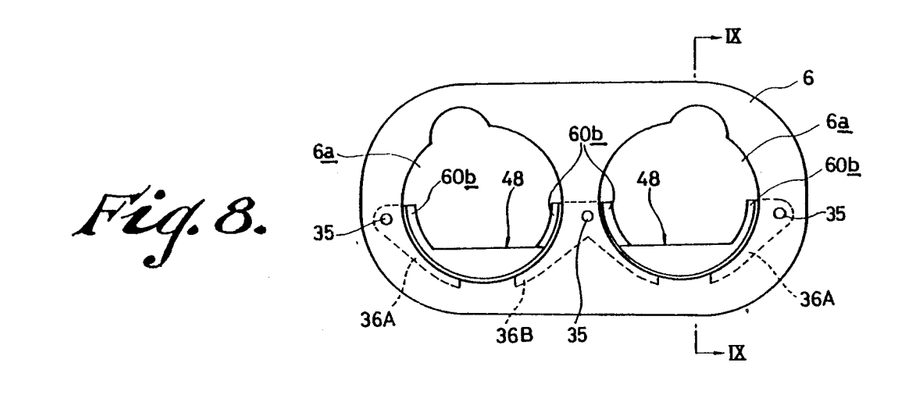
FIG. 8 is a right-side elevation view of a heater in an alternate embodiment of the invention.
Figure 9:
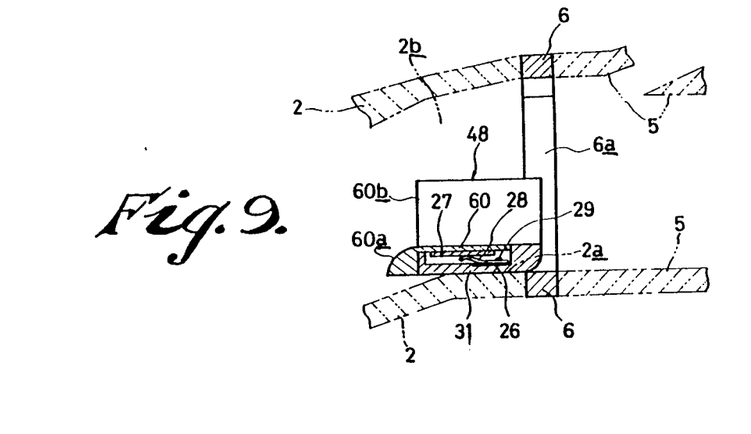
FIG. 9 is a cross section view along line IX—IX in FIG. 8.

FIGS. 8 and 9 show an example in which a similar heater (like the one shown in FIGS. 5 through 7) has been arranged in contact with the lower surface of the mixed gas passageway of the cylinder head. FIG. 8 is a right side elevation view and FIG. 9 is a cross section view along line IX—IX in FIG. 8.

As is shown in FIG. 9, the heat insulator 31 is arranged in contact with the lower inner peripheral surface 2a of the cylinder head. At the side edge of the tip of the heat transfer plate 60, there is formed a similar curved inclined surface 60a to what is shown in FIG. 3 and there exist a pair of curved parts 60b and 60b that are bent upward in parallel with the inner peripheral surface of the insulator through hole 6a from both ends of the flat part.

Since the heater 48 is located lower than the heater 38 shown in FIGS. 5 through 7, these extended curved parts extend longer accordingly in an upward direction, with their tips being located at the center of the vertical direction of the mixed gas passageway 2b.

In FIG. 8, reference numerals 36A and 36B are the fixed parts for fixing the heater 48 to the insulator 6.

As the heater 48 is arranged at the lowermost part of the mixed gas passageway 2b inside the cylinder head and the heat transfer plate curved parts 60b and 60b are made large, the aforementioned effect of the heater 38 is shown in FIGS. 5 through 7 becomes all the more marked.

Figure 10:
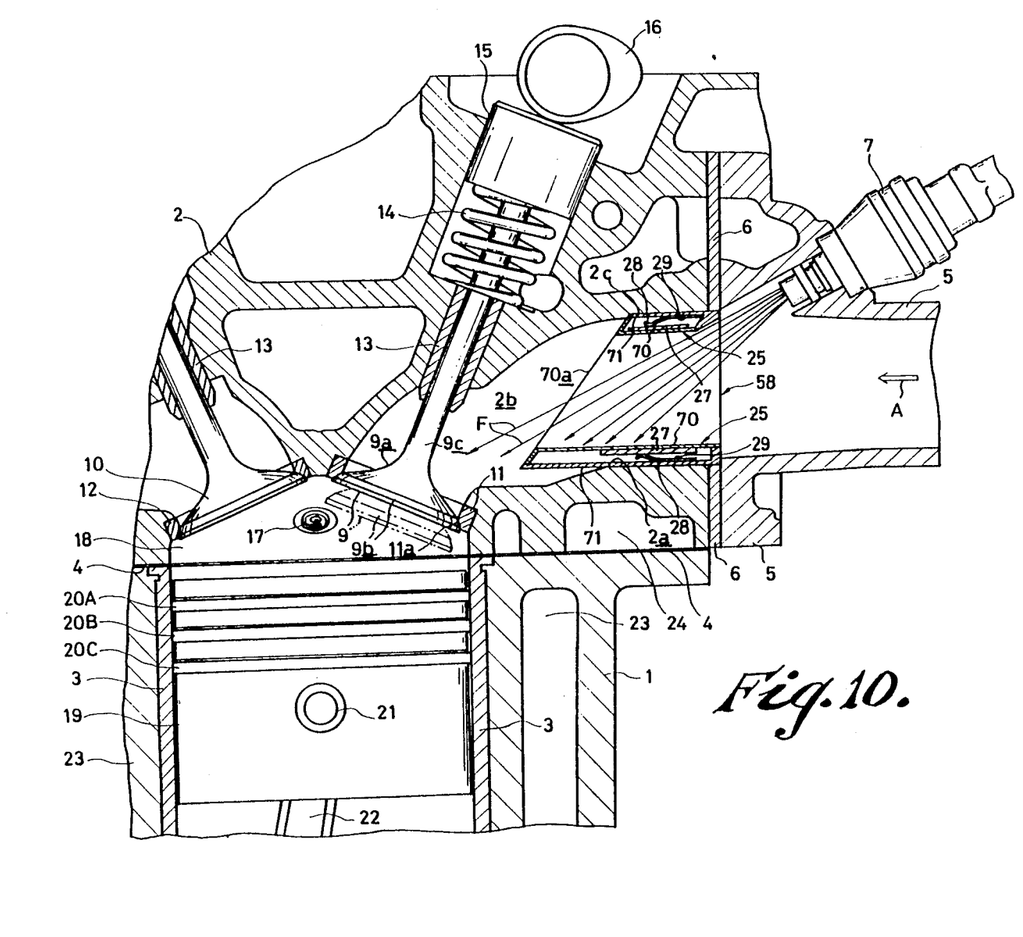
FIG. 10 is a cross section view similar to FIG. 1 in another alternate embodiment of the invention.

FIG. 10 is an expanded cross section of the area around the combustion chamber of the gasoline engine of the DOHC type incorporating an alternate embodiment of invention. This cross sectional figure is similar to FIG. 1.

The heater 58 is in the shape of a cylinder, with its cross sectional structure being similar to the structure shown in FIG. 3. The heat insulator 71 and heat transfer plate or member 70 are cylindrical in shape and are concentrically located and a contact spring 28 and PTC element 27 which are fixed to the electric source terminal 26 by a rivet 29 are accommodated in the space between the two as shown in FIG. 3, there constituting a heating part 25.

A large number of heating parts 25 (such as four heating parts) are arranged circumferentially around the heater 58. In the cross section, however, only two, up and down, are shown in the drawing. The top side of the heater 58 is tilted in such a fashion that the top is small in the direction along the central axis to be accommodated in the cylinder inlet passageway but the bottom becomes larger, and the surface of an inclined plate 70a which is set extending from the heat transfer plate 70 forms the side edge face of the heater tip for substantially guiding deflected fuel into the cylinder inlet opening.

The lower tip of the heater 58 is located in the neighborhood of the reverse side of the heat 9a of the air intake valve 9. The fixing of the air intake valve 58 to the cylinder head 2 is effected by inserting a heater 58 into the stepped part (concave part) 2c which is provided in the mixed gas passageway 2b.

The atomized gasoline F that has been injected from the injector mostly comes into collision with the lower half of the inner peripheral heat transfer plate 70 of the heater 58 but a part of the same collides with the upper half of the same. Accordingly, the lower side of the heater 58 is made longer.

The injected gasoline F comes into collision with the heat transfer plate 70 of the heater 58, thereby being heated, and, when it leaves the heater 58, it is mixed with the air intake A and immediately enters the inlet opening of the combustion chamber 18 through the gap between the open air intake valve 9 (which is shown by a broken line) and the air intake valve seat 11.

Accordingly, the injected gasoline F seldom discharges or loses heat in the mixed gas passageway 2b and, along with the increased area of the heat transfer plate 70 due to the shaping of the heater 58 in a cylindrical shape, the heating efficiency increases. As a result of this, engine start-up can be effected with satisfactory acceleration even at the time of the start-up when the engine is cool.

Figure 11:
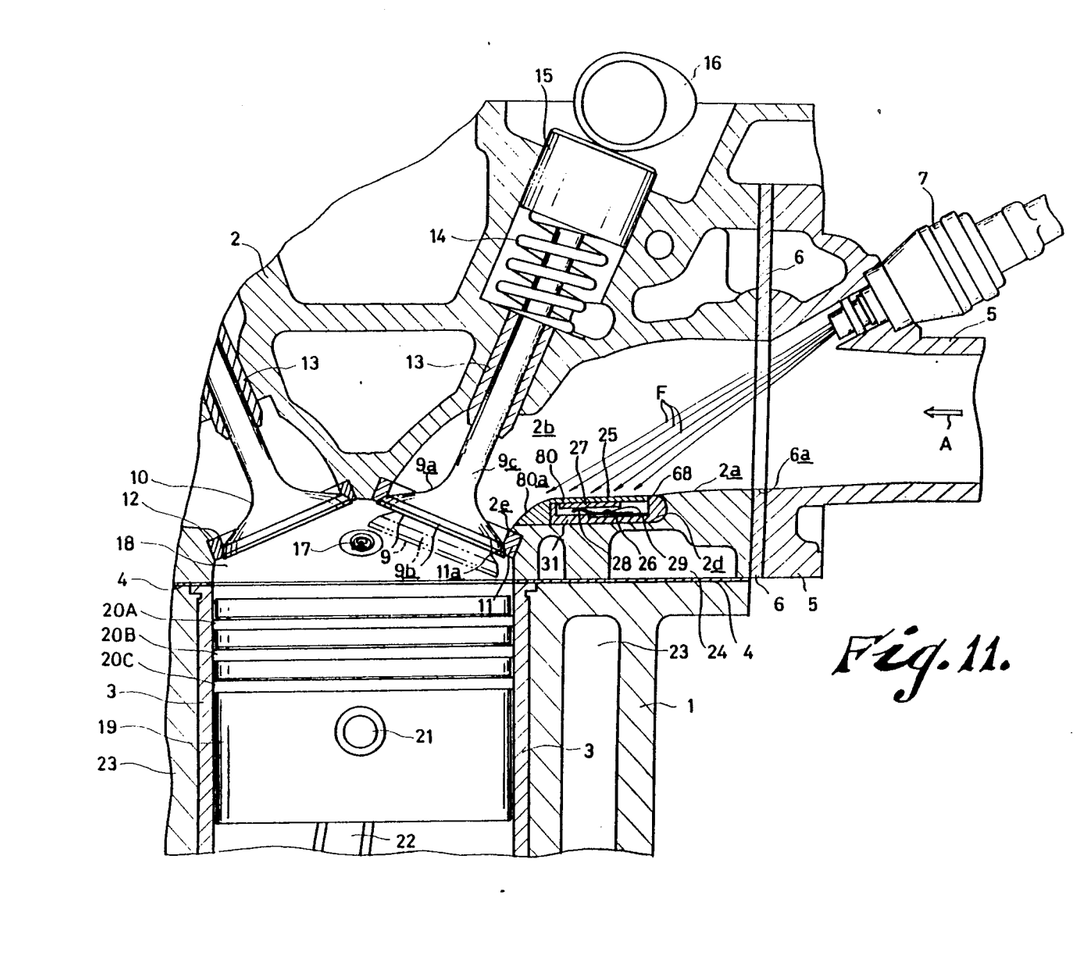
FIG. 11 is a cross section view similar to FIG. 1 in another alternate embodiment of the invention.

FIG. 11 is an expanded cross section as shown in FIG. 10 of an engine wherein a heater which is similar to the heater 8 in FIG. 3 is buried on the wall surface of the mixed gas passageway of the cylinder, with its upper surface being exposed to the mixed gas passageway.

The heater 68 is separated from the insulator 6 and is fixed to the cylinder head 2 as it is inserted into the stepped part (concave part) 2d which is provided on the lower surface of the mixed gas passageway 2b of the cylinder head 2. The surface of the heat transfer plate 80 is located on an extension of the lower surface 2a of the mixed gas passageway 2b and the inclined surface 80a at the tip of the heat transfer plate 70 is more gently sloping than the inclined surface 30a shown in FIG. 3, with its tip being located slightly on this side of the air intake valve seat 11.

In addition, the inclined surface 80a and the wall surface 2e of the mixed gas passageway which is adjacent to the inclined surface 80a form a contiguous curved surface.

Since the heater 68 is arranged in the neighborhood of the air intake valve seat 11 as described above, the heating of the injected gasoline F becomes fully effective. Moreover, since the inclined surface 80a of the heat transfer plate 80 and the inclined surface 2e of the cylinder head constitute a contiguous curved surface, these inclined surfaces serve the role of a deflecting or direction rectifying surface and, as in the examples shown in FIGS. 1 through 9, the air intake A and the injected gasoline F are led to the combustion chamber 18 without waste, thereby realizing ideal driving in conformity with the state of the engine.

Since the surface of the heat transfer plate 80 is located on an extension of the lower surface 2a of the mixed gas passageway, further, the resistance to the flow or passage of the mixed gas is small, which is highly convenient.

Figure 12:
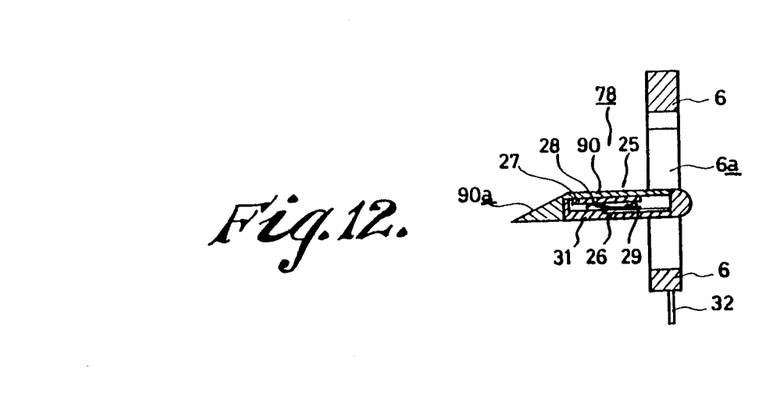
FIG. 12 is a cross section view of a heater in another embodiment of the invention.

The shape of the tip of the heater can be modified to other shapes such as the one shown in FIG. 12. In this example, the inclined surface at the tip of the heat transfer plate 90 of the heater 78 is made into a mildly inclined flat surface. It is easy to manufacture a heater that has a shape like this. The others are the same as the heater 8 shown in FIGS. 2 through 4 and same can be applied to the heaters 38 and 48 shown in FIGS. 5 through 9.

All of the above-described examples are those of the gasoline engine. This invention can also be applied to other fuel supply devices wherein the fuel is atomized and supplied together with air and to the heating devices incorporating the same. The detailed structures of these can be made suitably in conformity with the objective. It is also possible to separate the heating surface and the rectifying surface.

In addition, the air intake can be oxygen-enriched air.

Moreover, the shape, structure and quality of the aforementioned heating element can be modified in a variety of ways and even the heater element used can be something other than the PTC element (provided that the same is an electric heating element).

Since the fuel supply device based on the embodiments of the invention described with reference to FIGS. 1-9 and 2 have a heating surface that heats the injected fuel and air intake and a rectifying surface which rectifies the direction of at least the air intake toward the entrance to the combustion chamber provided in the heating device, the partial conversion into liquid drops as dew condensation irrespective of the ambient temperature is prevented as the injected fuel is heated and, along with the aforementioned rectification, the injected fuel is converted into a mixed gas without waste and is supplied to the combustion chamber. As a result of this, it becomes possible to supply a sufficient fuel in an air-fuel ratio that is required for the same to the combustion chamber, thereby enabling an efficient operation of the engine.

Since the fuel supply device based on the embodiments of the invention and the heating device described with reference to FIGS. 10-11 have the heating surface of a heating device that heats the injected fuel and the air intake provided in an area that the fuel inside the fuel passageway can reach and that faces and is substantially immediately adjacent the entrance to the combustion chamber, both the injected fuel and the air intake are supplied to the combustion chamber immediately after heating without dew condensation. As a consequence of this, both the injected fuel and the air intake enter the combustion chamber in a state of almost retaining the heating temperature, thereby ensuring an efficient operation of the engine.

Among the reference numerals used in the drawings, reference numeral 1 indicates a cylinder block, 2 is a cylinder head, 2a is a lower wall surface of a mixed gas passageway, 2b is a mixed gas passageway, 3 is a cylinder liner, 5 is an air intake manifold, 6 is an insulator, 7 is an injector, 8, 38, 48, 58, 68 and 78 are heaters, 9 is an air intake valve, 11 is an air intake valve seat, 17 is an ignition plug, 18 is a combustion chamber, 19 is a piston, 25 is a heating unit or part, 27 is a PTC heating element, 30, 50, 60, 70, 80 and 90 are heat transfer plates, 30a, 50a, 60a, 70a, 80a and 90a are the inclined surfaces (reflecting surfaces) of the heat transfer plate, F is gasoline injected, and A is air intact (or mixed gas).

It should be understood that the invention includes all modification and equivalents of the disclosed invention fully with the appended claims.

We claim:

1. A fuel supply and heating means comprising a cylinder head for an engine having walls defining a cylinder inlet passageway leading to an air-fuel inlet opening in an engine cylinder, an air intake and a fuel injector respectively directing air and fuel into the cylinder inlet passageway, and a heating device located in the passageway having a heating surface arranged to receive fuel from the fuel injector for heating the fuel, the heating surface being disposed relative to the fuel injector so that fuel received from the heating surface and deflected therefrom is deflected into the cylinder inlet opening substantially free of contact with the walls defining the cylinder inlet passageway to assure provision of a desired air-fuel ratio within the cylinder during engine start-up.

2. A fuel supply device and heating device comprising a cylinder head for an engine having walls defining a cylinder inlet passageway leading to an air-fuel inlet opening in an engine cylinder, an air intake and a fuel injector respectively directing air and fuel into the cylinder inlet passageway, and a heating device located in the passageway having a heating surface arranged to receive fuel from the fuel injector for heating the fuel and furnishing fuel heated by the surface into the cylinder inlet opening substantially free of contact with the cylinder head walls defining the cylinder inlet passageway for providing a desired air-fuel ratio within the cylinder during engine start-up, the heating device being arranged with said heating surface disposed to receive fuel from the fuel injector for deflecting said fuel in a rectified direction into said cylinder inlet opening substantially free of contact with said cylinder head passageway walls, the heating device comprising a support having a hole therein leading to the cylinder head passageway and a heating part mounted on the support to extend across the hole, the heating part having a heating surface thereof disposed to receive fuel from the fuel injector at a selected angle for deflecting the fuel at a selected angle substantially directly into the cylinder inlet opening.

* * * * *